US012166886B2

(12) United States Patent
Wang et al.

(10) Patent No.: US 12,166,886 B2
(45) Date of Patent: *Dec. 10, 2024

(54) SYSTEMS AND METHODS FOR AUTHENTICATED CONTROL OF CONTENT DELIVERY

(71) Applicant: Google LLC, Mountain View, CA (US)

(72) Inventors: Gang Wang, Jersey City, NJ (US); Marcel Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,637

(22) Filed: Jun. 21, 2022

(65) Prior Publication Data

US 2022/0329430 A1 Oct. 13, 2022

Related U.S. Application Data

(63) Continuation of application No. 16/758,782, filed as application No. PCT/US2019/049332 on Sep. 3, 2019, now Pat. No. 11,388,006.

(51) Int. Cl.
*H04L 9/32* (2006.01)
*G06F 16/903* (2019.01)
*H04L 9/08* (2006.01)

(52) U.S. Cl.
CPC .......... *H04L 9/3213* (2013.01); *H04L 9/0833* (2013.01); *H04L 9/3255* (2013.01); *G06F 16/903* (2019.01); *H04L 2209/60* (2013.01)

(58) Field of Classification Search
CPC ... H04L 9/3213; H04L 9/0833; H04L 9/3255; H04L 2209/60; H04L 9/12; H04L 9/3263;
(Continued)

(56) References Cited

U.S. PATENT DOCUMENTS 5,787,131 A 7/1998 Bottomley
5,819,222 A * 10/1998 Smyth ............... G10L 15/08
704/256.1
(Continued)

FOREIGN PATENT DOCUMENTS

CN 105243313 1/2016
CN 108463982 8/2018
(Continued)

OTHER PUBLICATIONS

International Preliminary Report on Patentability in International Appln No. PCT/US2019/049332, mailed on Mar. 17, 2022, 11 pages.

(Continued)

*Primary Examiner* — Abu S Sholeman
(74) *Attorney, Agent, or Firm* — Fish & Richardson P.C.

(57) ABSTRACT

The present disclosure provides systems and methods for authenticated control of content delivery. The method includes receiving a request for an item of content from a computing device, the request comprising a security token associated with the computing device and an identifier of a group of domains, identifying the group of domains from the identifier, and retrieving a security key associated with the group of domains. The method further includes decrypting a signature of the security token, identifying an authentication string, determining that the authentication string matches a server authentication string, and identifying characteristics of the security token. The characteristics of the security token include a confidence score. The method further includes comparing the confidence score of the security token to a threshold, determining that the confidence score does not exceed the threshold, and preventing transmission of content to the computing device.

17 Claims, 5 Drawing Sheets

(58) Field of Classification Search
CPC ............... H04L 9/3297; H04L 63/0421; H04L 63/1441; H04L 67/02; H04L 9/085; H04L 9/0866; H04L 9/3226; H04L 9/3247; H04L 9/0863; H04L 9/088; G06F 16/903
See application file for complete search history.

(56) References Cited

U.S. PATENT DOCUMENTS

| | | | |
|---|---|---|---|
| 5,944,783 | A | 8/1999 | Nieten |
| 7,577,758 | B2* | 8/2009 | Ricciulli ................. H04L 69/22 |
| | | | 709/224 |
| 7,877,493 | B2 | 1/2011 | Quinlan |
| 8,069,435 | B1* | 11/2011 | Lai .......................... H04L 67/51 |
| | | | 717/106 |
| 8,775,810 | B1 | 7/2014 | Snodgrass et al. |
| 9,154,470 | B2 | 10/2015 | Lebron et al. |
| 10,970,393 | B1* | 4/2021 | Stiles .................... G06F 21/554 |
| 11,444,977 | B2* | 9/2022 | Starov ................... G06F 16/972 |
| 11,823,272 | B2* | 11/2023 | Kapoor ................... G06Q 40/12 |
| 2004/0044912 | A1 | 3/2004 | Connary et al. |
| 2005/0091661 | A1 | 4/2005 | Kurien et al. |
| 2006/0230437 | A1 | 10/2006 | Boyer et al. |
| 2008/0162227 | A1 | 7/2008 | Jakobsson et al. |
| 2008/0240253 | A1 | 10/2008 | Au et al. |
| 2009/0210418 | A1* | 8/2009 | Arasu .................... G06F 16/258 |
| 2009/0300014 | A1* | 12/2009 | Chakrabarti .......... G06F 16/353 |
| 2010/0050251 | A1* | 2/2010 | Speyer ................... G06Q 10/06 |
| | | | 726/20 |
| 2010/0128876 | A1 | 5/2010 | Yang et al. |
| 2010/0250655 | A1* | 9/2010 | Xu ..................... H04N 21/2408 |
| | | | 709/203 |
| 2011/0314557 | A1 | 12/2011 | Marshall |
| 2012/0131652 | A1* | 5/2012 | Anand ................ H04L 63/0823 |
| | | | 726/5 |
| 2012/0214443 | A1* | 8/2012 | Daigle .................. H04L 9/3228 |
| | | | 455/411 |
| 2015/0150110 | A1* | 5/2015 | Canning ............. H04L 63/0807 |
| | | | 726/9 |
| 2015/0161105 | A1* | 6/2015 | Trivi ....................... G06F 40/40 |
| | | | 704/9 |
| 2016/0065534 | A1* | 3/2016 | Liu ........................ G06F 16/951 |
| | | | 707/728 |
| 2016/0117732 | A1 | 4/2016 | Zou |
| 2018/0124043 | A1 | 5/2018 | Chester |
| 2018/0278624 | A1 | 9/2018 | Kuperman et al. |
| 2018/0375664 | A1 | 12/2018 | Maxwell et al. |
| 2019/0081958 | A1 | 3/2019 | Lee |
| 2020/0067907 | A1* | 2/2020 | Avetisov ............... H04L 67/133 |

FOREIGN PATENT DOCUMENTS

| | | |
|---|---|---|
| JP | 2007-286803 | 11/2007 |
| KR | 10-2005-0058598 | 6/2005 |
| KR | 10-2014-0026619 | 3/2014 |
| KR | 10-2014-0030518 | 3/2014 |

OTHER PUBLICATIONS

International Search Report and Written Opinion in International Appln. No. PCT/US2019/049332, dated May 4, 2020, 12 pages.
Office Action in Chinese Appln. No. 201980006218.9, dated Sep. 9, 2022, 31 pages (with English Translation).
Office Action in Indian Appln. No. 202027020879, dated Aug. 11, 2022, 5 pages (with English translation).
Office Action in Japanese Appln. No. 2020-530508, dated Sep. 6, 2021, 5 pages (with English translation).
Office Action in Korean Appln. No. 10-2020-7015926, dated Sep. 22, 2020, 10 pages (with English translation).
Notice of Allowance in Chinese Appln. No. 20198006218.9, dated Feb. 15, 2023, 5 pages (with English translation).
Hearing Notice in Indian Appln. No. 202027020879, dated May 7, 2023, 2 pages (with English translation).

* cited by examiner

SYSTEMS AND METHODS FOR AUTHENTICATED CONTROL OF CONTENT DELIVERY

CROSS-REFERENCE TO RELATED APPLICATIONS

This is a continuation application of, and claims priority to, U.S. patent application Ser. No. 16/758,782, filed on Apr. 23, 2020, which application is a National Stage Application under 35 U.S.C. § 371 and claims the benefit of International Application No. PCT/US2019/049332, filed Sep. 3, 2019. The disclosures of the foregoing applications are incorporated herein by reference in their entirety for all purposes.

BACKGROUND

People may shop online for goods instead of going to brick and mortar stores. While people are visiting different web pages and domains to shop, in many instances, third parties associated with the web pages and domains may provide content to the computing devices that the people use to visit the web pages. The third parties may provide the content responsive to requests from the computing devices. In some cases, malicious parties may send requests for content in cyberattacks (e.g., denial-of-service attacks, distributed-denial-of-service attacks, replay attacks, timing attacks, etc.).

For various reasons including security policies imposed by device operating systems, third parties such as content providers may be unable to obtain information about the computing devices to which the third parties provide content. As a result, the third parties may not be able to determine whether a device that is requesting content is a user browsing the internet or a malicious party. Consequently, malicious parties may trick the third parties into providing the malicious parties with content using fraudulent requests and performing various types of cyberattacks. As such, the third parties may wish to verify that the device is associated with a legitimate user. However, in many instances, if the device or user attempts to provide authentication information or other data indicating that the computing device is not associated with a cyberattack or a malicious party, the computing device may unintentionally reveal more information about the computing device or a domain that the computing device is associated with than desired. Worse, in some instances, malicious parties may eavesdrop or intercept communications between the computing device and the third party or content provider and may obtain access to personal information of the user or information about the computing device.

SUMMARY

The systems and methods discussed herein provide a method for authenticated control of content delivery so content servers can determine whether a request for content originated at a computing device that is associated with a malicious entity, without exposing information about the computing device or user. As a computing device accesses various web pages, creates user accounts associated with the web pages, logs into the user accounts, and/or has authenticated communications via the webpages, the servers associated with the webpages may maintain confidence scores associated with the computing device. The confidence scores may indicate a degree of certainty that each server has that the computing device is not associated with a malicious entity (e.g., is associated with a user that is accessing the web pages for content instead of to perform a cyberattack). In some implementations, upon determining that the computing device is not associated with a malicious entity to a degree of certainty exceeding a threshold, the server of a web page may sign a security token with a group signature associated with a group of servers that are associated with each other (e.g., a server consortium), and store the security token including an identification of the group of servers associated with the group signature in the browser of the computing device.

In some implementations, to protect the privacy of computing devices that send requests for content, servers that provide requesting computing devices with security tokens may provide the computing devices with certificates associated with a subgroup of the server consortium that the computing devices can use to anonymously sign requests. The server may partition hashed identifiers of computing devices about which it has information into various subgroups (e.g., subgroups of the server consortium). The server may associate a group signature with each subgroup. Upon determining that the requesting computing device is not associated with a malicious party to a degree of certainty above a threshold the server may provide computing devices of each subgroup with the certificates of the subgroup for the computing devices to sign requests that can only be verified using a public encryption key associated with the group signature. In requests for content, computing devices can include the group signature of the server consortium and the group signature of the subgroup of the server consortium in the request. Because the signatures do not include individually identifying information of the computing device or the server that provided the signature other than information about which server consortium the signing server is associated with, the content server may not be able to identify which specific server provided the security token or which computing device sent the request.

Upon accessing another webpage, the computing device may send a request for content to a content server including the security token. The content server may determine if the security token is valid (e.g., use a security key associated with the group of servers to decrypt a signature of the security token and verify that the decryption was successful). If the security token is valid, the content server can determine whether the security token meets certain criteria (e.g., determine if the confidence score of the security token exceeds a threshold). If the security token is valid and meets the criteria, the content server may provide the requesting computing device with content. If the security token is invalid or if it otherwise does not meet the criteria, the content server may prevent transmission of content to the computing device (e.g., not provide any content to the computing device).

Advantageously, by implementing the systems and methods discussed herein, computing devices may provide content servers with verification received from servers of various websites indicating that the computing devices are legitimate or are not associated with a malicious attacker. The computing devices may do so without providing identifying information of the requesting computing device or the server that provided the verification to the requesting computing device. While the content server may identify groups of servers that are associated with group signatures that the content server receives, the groups of servers may include numerous servers from which the content server will not be able to identify individual servers based on the group signature of the group. Further, to anonymize computing devices from being individually identified by the content server, the computing devices may sign the security token with a second group signature associated with a subset of computing devices that are associated with the server (e.g., that have accessed a website associated with the server). The second group signature may keep the requesting computing devices anonymous so content servers may not be able to identify the computing devices from the requests for content that include the same signature.

In an aspect described herein, a method for authenticated control of content delivery is described. The method may comprise receiving, by a server device, a request for an item of content from a computing device, the request comprising a security token associated with the computing device and an identifier of a group of domains with which the security token is associated; identifying, by the server device, the group of domains from the identifier; retrieving, by the server device, a security key associated with the group of domains; decrypting, by the server device, a signature of the security token using the security key; identifying, by the server device, an authentication string associated with the security token; determining, by the server device, that the authentication string matches a server authentication string; and responsive to the determination that the authentication string matches the server authentication string, identifying, by the server device, characteristics of the security token, wherein the characteristics of the security token comprise a confidence score indicating a likelihood that the computing device is not associated with a malicious entity. The method may further comprise comparing, by the server device, the confidence score of the security token to a threshold; determining, by the server device, that the confidence score does not exceed the threshold; and responsive to the determination that the confidence score does not exceed the threshold, preventing, by the server device, transmission of content to the computing device.

In some implementations, the threshold may be associated with the identification of the group of domains. Comparing the confidence score of the security token to the threshold may further comprise, responsive to the identification of the group of domains from the identifier, identifying, by the server device, the threshold associated with the identification of the group of domains, and comparing the confidence score to the threshold.

In some implementations, the confidence score may be calculated by a server associated with the group of domains responsive to identifications of browsing activity of the computing device on a website associated with at least one domain of the group of domains. In some implementations, the identifications of browsing activity may comprise a creation of an account on the website, a number of logins to the website, a number of visits to the website, a number of interactions on the web site, or a previous instance of authenticated communication.

In some implementations, the method may further comprise receiving, by the server device, a second request for a second item of content from a second computing device, the second request comprising a second security token associated with the second computing device and a second identifier of a second group of domains with which the second security token is associated; identifying, by the server device, the second group of domains from the second identifier; retrieving, by the server device, a second security key associated with the second group of domains; decrypting, by the server device, a second signature of the second security token using the second security key; identifying, by the server device, a second authentication string associated with the second security token; and determining, by the server device, that the second authentication string matches a second server authentication string. The method may further comprise, responsive to the determination that the second authentication string matches the second server authentication string, identifying, by the server device, second characteristics of the security token. The second characteristics of the security token may comprise a second confidence score indicating a second likelihood that the second computing device is not associated with a malicious entity. The method may further comprise comparing, by the server device, the second confidence score of the second security token to a second threshold determining, by the server device, that the second confidence score exceeds the second threshold; and responsive to the determination that the second confidence score exceeds the second threshold, transmitting, by the server device, content to the second computing device.

In some implementations, the second authentication string may comprise a time stamp. The method may further comprise identifying, by the server device, a time of the time stamp; comparing, by the server device, the time with a present time; determining, by the server device, a length of time between the time and the present time; comparing, by the server device, the length of time to a third threshold; and determining, by the server device, that the length of time is below the third threshold. Transmitting the content to the second computing device may further be performed responsive to the determination that the length of time is below the third threshold.

In some implementations, the method may further comprise receiving, by a server device, a second request for a second item of content from a second computing device, the second request comprising a plurality of second security tokens associated with the second computing device, each second security token associated with a different group of domains associated with a second identifier. The method may further comprise, for each second security token of the plurality of second security tokens: identifying, by the server device, a second group of domains from the second identifier; retrieving, by the server device, a second security key associated with the second group of domains; decrypting, by the server device, a second signature of the second security token using the second security key; identifying, by the server device, a second associated with the second security token; determining, by the server device, that the second authentication string matches a second server authentication string; and responsive to the determination that the second authentication string matches the second server authentication string, incrementing, by the server device, a count of a counter. The method may further comprise comparing, by the server device, the count to a second threshold; determining, by the server device, that the count exceeds the second threshold; and responsive to the determination that the count exceeds the threshold, transmitting, by the server device, content to the second computing device.

In some implementations, the request may further comprise a second security key. The method may further comprise, responsive to the authentication string matching the server authentication string, retrieving, from the request and by the server device, the second security key; decrypting, by the server device, a second signature of the security token using the second security key; identifying, by the server device, a second authentication string associated with the security token; and determining, by the server device, that the second authentication string matches a second server authentication string. Identifying the confidence score may further be performed responsive to the determination that the second authentication string matches the second server authentication string.

In some implementations, the second security key may be associated with a subgroup of the group of domains. The subgroup of the group of domains may be associated with a plurality of computing devices that are associated with a domain of the group of domains. In some implementations, the second security key is associated with the computing device.

In another aspect described herein, server device for authenticated control of content delivery is described. The server device may comprise a network interface in communication with a first client device of a plurality of client devices and a processor. The processor may be configured to: receive, via the network interface and from the first computing device, a request for an item of content, the request comprising a security token associated with the computing device and an identifier of a group of domains with which the security token is associated; identify group of domains from the identifier; retrieve a security key associated with the group of domains; decrypt a signature of the security token using the security key; identify an authentication string associated with the security token; determine that the authentication string matches a server authentication string; and, responsive to the determination that the authentication string matches the server authentication string, identify characteristics of the security token, wherein the characteristics of the security token comprise a confidence score indicating a likelihood that the computing device is not associated with a malicious entity. The processor may be further configured to compare the confidence score of the security token to a threshold; determine that the confidence score does not exceed the threshold; and, responsive to the determination that the confidence score does not exceed the threshold, prevent transmission of content to the computing device.

In some implementations, the threshold may be associated with the identification of the group of domains and wherein the processor compares the confidence score of the security token to the threshold by identifying the threshold associated with the identification of the group of domains; and comparing the confidence score to the threshold.

In some implementations, the confidence score may be calculated by a server associated with the group of domains responsive to identifications of browsing activity of the computing device on a website associated with at least one domain of the group of domains. In some implementations, the identifications of browsing activity may comprise a creation of an account on the website, a number of logins to the website, a number of interactions on the website, or a number of visits to the website.

In some implementations, the processor may be further configured to receive, via the network interface and from a second computing device, a second request for a second item of content from the second computing device, the second request comprising a second security token associated with the second computing device and a second identifier of a second group of domains with which the second security token is associated; identify the second group of domains from the second identifier; retrieve a second security key associated with the second group of domains; decrypt a second signature of the second security token using the second security key; identify a second authentication string associated with the second security token determine that the second authentication string matches a second server authentication string; responsive to the determination that the second authentication string matches the second server identify second characteristics of the security token. The second characteristics of the security token may comprise a second confidence score indicating a second likelihood that the second computing device is not associated with a malicious entity. The processor may be further configured to compare the second confidence score of the second security token to a second threshold; determine that the second confidence score exceeds the second threshold; and, responsive to the determination that the second confidence score exceeds the second threshold, transmit, via the network interface and to the second computing device, content to the computing device.

In some implementations, the second authentication string may comprise a time stamp. The processor may be further configured to identify a time of the time stamp; compare the time with a present time; determine a length of time between the time and the present time; compare the length of time to a third threshold; and determine that the length of time is below the third threshold. The processor may transmit the content to the second computing device further responsive to the determination that the length of time is below the second threshold.

In some implementations, the processor may be further configured to receive, via the network interface and from a second computing device, a second request for a second item of content from a second computing device, the second request may comprise a plurality of second security tokens associated with the second computing device, each second security token associated with a different group of domains associated with a second identifier. For each second security token of the plurality of second security tokens, the processor may be configured to identify, by the server device, a second group of domains from the second identifier retrieve a second security key associated with the second group of domains; decrypt a second signature of the second security token using the second security key; identify a second authentication string associated with the second security token; determine that the second authentication string matches a second server authentication string; and, responsive to the determination that the second authentication string matches the second server authentication string, increment a count of a counter. The processor may be further configured to compare the count to a threshold' determine that the count exceeds the threshold; and, responsive to the determination that the count exceeds the threshold, transmit, via the network interface and to the second computing device, content to the second computing device.

In some implementations, the request may further comprise a second security key. The processor may be further configured to, responsive to the authentication string matching the server authentication string, retrieve, from the request, the second security key; decrypt a second signature of the security token using the second security key; identify a second authentication string associated with the security token; and determine that the second authentication string matches the second server authentication string. The processor may identify the confidence score further responsive to the determination that the second authentication string matches the second server authentication string.

In some implementations, the second security key may be associated with a subgroup of the group of domains, and wherein the subgroup of the group of domains is associated with a plurality of computing devices that are associated with a domain of the group of domains. In some implementations, the second security key is associated with the computing device.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

As third parties provide content to client devices through content servers, the third parties may not be able to determine whether devices that request content are associated with users that are browsing the internet or are malicious parties performing cyberattacks, such as denial of service attacks, "click-fraud" attacks (e.g. requests for content solely intended to increase payments to a content provider or publisher, rather than a legitimate request for the content, etc.) or fraudulent requests for content, or similar requests for content that are illegitimate or otherwise not associated with a legitimate user or request. Consequently, malicious parties may trick the third parties into providing the malicious parties with content using fraudulent requests. The fraudulent requests may be a part of cyberattacks (e.g., denial-of-service attacks, distributed-denial-of-service attacks, replay attacks, timing attacks, etc.) against the third parties. As such, the third parties may wish to verify that the device is associated with a legitimate user.

To verify that client devices are associated with legitimate users, content servers associated with the third parties may rely on other servers that may have information about the client devices (e.g., through information that the client devices provide by creating and/or logging into an account on a website associated with the server, visiting the website and/or through authenticated communication performed through the website). The other servers may provide client devices with authentication information that may prove that the client devices are not associated with a malicious entity. In requests for content, a client device may provide the authentication information to the content servers indicating that a server has determined that the client device is likely not associated with a malicious party. The client device that sends the requests for content may not be able to send the requests without providing identifying information about the client device or the server that provided the authentication information. Methods to separate users that are browsing the internet from malicious third parties may enable content servers providing content and, in some cases, eavesdroppers that intercept the requests, to individually identify the computing devices that request content and/or the data collection capabilities of servers that provide authentication information to the client devices.

Figure 1:
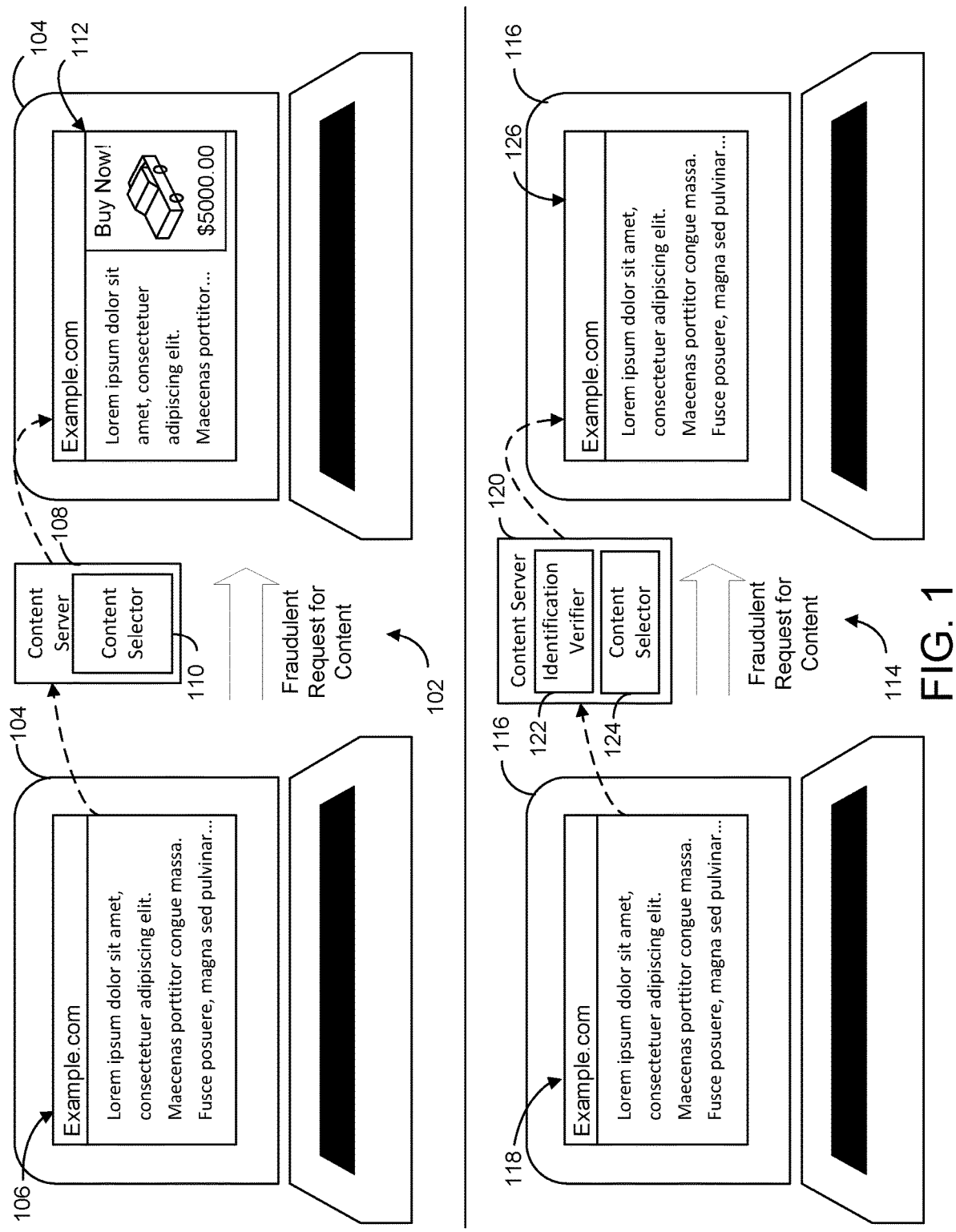
FIG. 1 is a block diagram of two sequences, each sequence including a computing device request content from a content server, according to some implementations.

For example, referring first to FIG. 1, illustrated is a block diagram of two sequences 102 and 114, each sequence 102 and 114 including a computing device sending a request for content to a content server, in some implementations. Sequence 102 may be a sequence including a client device 104 with a user interface of an application such as a browser application. In some cases, the browser application may not render an output (e.g., a headless browser). Client device 104 may request content from a content server 108. A malicious entity may use the browser application to perform various cyberattacks (e.g., denial-of-service attacks, distributed-denial-of service attacks, replay attacks, timing attacks, etc.) on content servers. For example, in a cyberattack, a malicious party may use the browser application to browse the Internet without loading picture or video files. The browser application may continuously request content from content server 108 without displaying the content. Content server 108 may provide content to the browser application without determining if the requests originated from a malicious entity. Sequence 114 may be a sequence of another client device 116 with a browser application requesting content from a content server 120 in a cyberattack. Content server 120 may receive the request, determine the request is likely associated with a malicious entity, and prevent transmission of content to the browser application.

At sequence 102, using a browser application and upon visiting a website, client device 104 may send a request for content to content server 108. A user interface of the browser application may display a display 106 upon loading a webpage. Via the browser application, client device 104 may send a fraudulent request for content (e.g., a request associated with a cyberattack) from content server 108. Content server 108 may not have a method of determining that the request originated at a client device associated with a malicious entity and may, via a content selector 110, provide content to the malicious entity. A display 112 may display the interface of the browser application after receiving the content. Consequently, content server 108 may have provided content to a malicious entity. Although referred to as "fraudulent", the request may be considered illegitimate in any way, as discussed above, such as a malicious denial of service attack, a spurious request from a malfunctioning device, a request not associated with a legitimate user, a "click fraud" request, or any other type of request that should not be responded to normally.

Conversely, sequence 114 illustrates an example sequence of a client device 116 sending a similar fraudulent request for content to a content server 120. In sequence 114, however, client device 116 may include a security token or code that client device 116 generated based on a token or code that client device 116 received from a server. The server may have provided the security token or code, responsive to determining, to a likelihood above a threshold, that client device 116 is not associated with a malicious entity. The security token or code may include one or more signatures, such as one or more group signatures. One such signature may be associated with a server consortium that distributes certificates to servers of the server consortium that the servers may use to sign security tokens.

The signatures of the certificates may only be decrypted using a security key (e.g., a public encryption key) associated with the server consortium. The other signature may be associated with a subgroup of the server consortium, which the client device is a part of A server that signs and provides a security token to a client device may partition each client device associated with a website associated with the server into various groups. The server may provide a certificate to the client devices of each subgroup that enables the client device to sign security tokens with a signature that may only be decrypted using a security key associated with the subgroup. When requesting content from content server 120, client device 116 may include a security token including the signature from the server that provided the security token a signature associated with the subgroup that client device 116 is associated with, and a security key associated with the subgroup that content server 120 can use to verify the signature of the subgroup.

Content server 120 may be a server that receives requests for content and provides content to requesting client devices. Content server 120 may receive the request for content including the security token and the dual group signatures from client device 116 and determine if the signatures are authentic. Through an identification verifier 122, content server 120 may verify whether client device 116 is associated with a malicious entity. As will be described in greater detail below, identification verifier 122 may use security keys to verify both group signatures of the security token. If the signature verification is successful, identification verifier 122 may identify a confidence score that the server provided in the security token that the server stored in client device 116. Identification verifier 122 may use the confidence score, in addition to other information (e.g., information about the server consortium with which the server is associated), to determine whether it is likely (e.g., to a threshold) that the client device is not associated with a malicious entity. If identification verifier 122 determines that client device 116 is likely associated with a malicious entity, a content selector 124 of content server 120 may not provide content to client device 116 or provide content that is associated with a low value.

A display 118 may show the output of a browser application running on client device 116 upon loading a webpage before client device 116 requests content from content server 120. A display 126 may show the output of content server 120 if content server 120 determines that client device 116 is likely associated with a malicious entity. As shown, display 126 may not include content from content server 120 because content server 120 may have determined client device 116 is likely associated with a malicious entity and declined to provide content responsive to the request. Although not shown, if content server 120 determines client device 116 is likely not associated with a malicious entity, content server 120 may select and send content to client device 116.

Advantageously, as represented in sequence 114, because client device 116 can provide security tokens to content server 120 to authenticate client device 116 as a client device that is likely not associated with a malicious party, content server 120 can filter the client devices that it provides content to and avoid providing content to malicious entities. Dual group signatures in the security token can help protect the privacy of client device 116 and the data collection capabilities of servers that provide the client devices with security tokens. The security tokens may indicate that the servers have determined, to a sufficient likelihood, that the client device is not associated with a malicious entity. Consequently, content server 120 can identify, to a certain likelihood, whether client devices associated with requests for content are not associated with a malicious entity. Content server 120 may avoid providing content to client devices that are likely associated with a malicious entity and provide content to the client devices that are likely not associated with a malicious entity.

Further, in addition to protecting the privacy of the client devices that request content, the systems and methods described herein may provide for protection of confidential information (e.g., data collection capabilities and relationships) of the servers of the server consortiums that provide security tokens indicating that the client devices are not associated with a malicious party. Because the security tokens include group signatures of the server consortiums instead of signatures of the individual servers, the content servers that provide content or other malicious parties (e.g., eavesdroppers) may not be able to individually identify the servers or identify a number of client devices that are associated with each server. Consequently, neither content servers nor malicious parties may be able to individually identify the servers that provide security tokens or relationships between requesting client devices and the servers.

Finally, the systems and methods described herein may also help servers of various server consortiums identify client devices that are likely not associated with malicious parties accessing websites associated with (e.g., hosted on) the servers. The servers may keep track of the activity of the client devices and label client devices they trust by storing a security token in the browser of the client device once the servers have determined that the client devices may not be associated with a malicious party. The servers may use rules and processes of server consortiums that they are associated with to determine which client devices to trust.

Figure 2A:
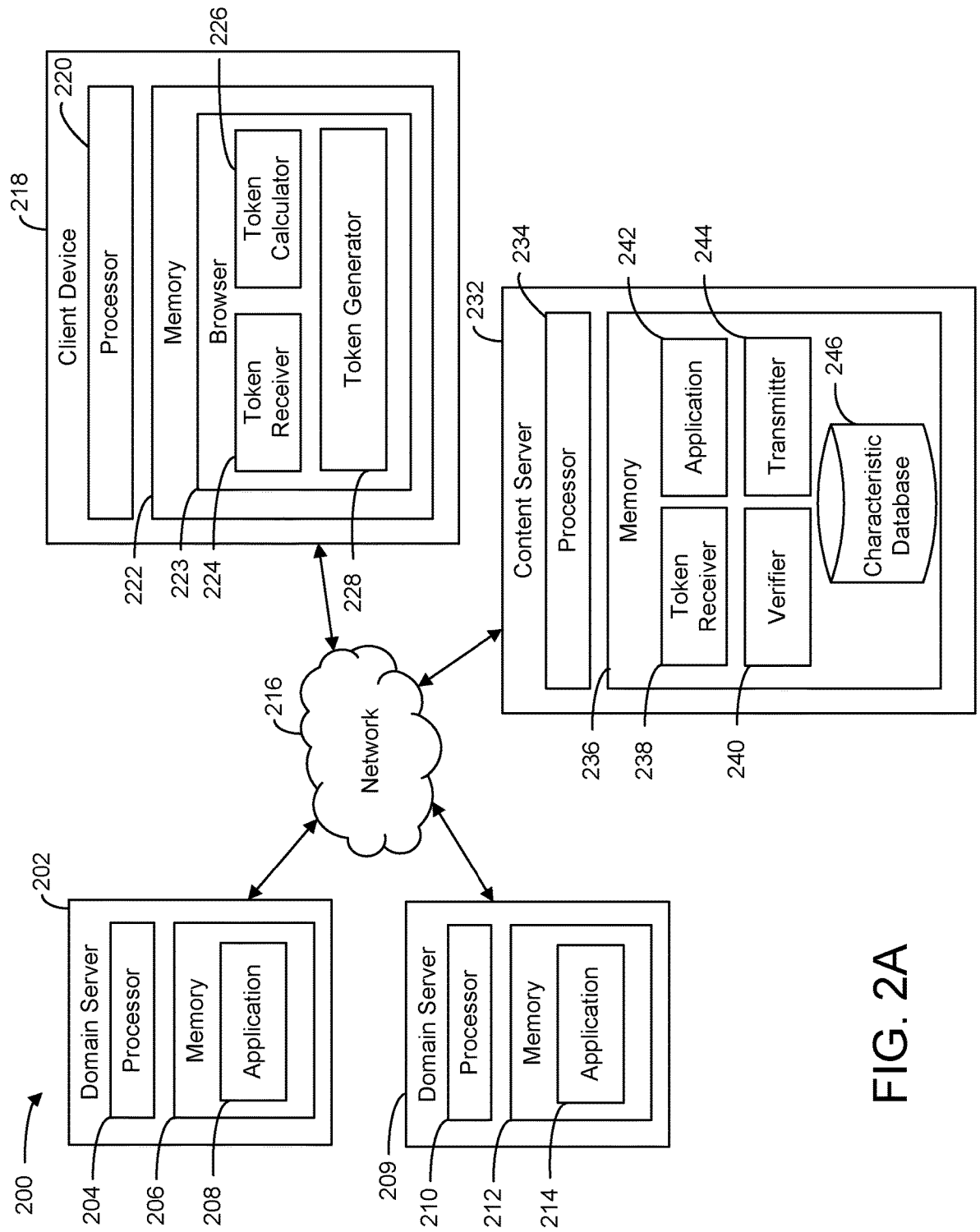
FIG. 2A is a block diagram of an implementation of a system for authenticated control of content delivery, according to some implementations.

For example, referring now to FIG. 2A, an implementation of a system for authenticated control of content delivery is shown according to some implementations. System 200 is shown to include domain servers 202 and 209 a network 216 a client device 218 and a content server 232. Client device 218 can browse the Internet by visiting web pages and domains associated with different third parties and their servers. Client device 218 can browse the Internet via network 216. Network 216 can include synchronous or asynchronous networks. As client device 218 browses the Internet, client device 218 may receive security tokens from servers (e.g., domain servers 202 and 209) associated with various websites that client device 218 visits. The security tokens may indicate that the server that provided the security token was confident that client device 218 is not associated with a malicious entity. Client device 218 may provide the security token to content server 232 in a request for content upon visiting another website. As described below in greater detail, content server 232 may identify the security token and determine whether the security token provides enough information for content server 232 to provide client device 218 with content. If content server 232 determines client device 218 is not associated with a malicious entity, content server 232 may provide client device 218 with content responsive to the request. However, if content server 232 determines client device 218 is likely associated with a malicious entity, content server 232 may not provide content to client device 218 or provide content that is associated with a small value.

Domain servers 202 and 209 may each comprise one or more servers or processors configured to determine, to a degree of certainty (e.g., a confidence score), whether client device 218 is associated with a malicious entity and provide authentication (e.g., via a security token) to client device 218 if either of domain servers 202 or 209 are confident enough that client device 218 is not associated with a malicious entity. As described herein, domain servers may be described as domain server, servers, or any other device that is associated with a website and can provide security tokens to browsers of client devices. Domain servers 202 and 209 may each be associated with a group of servers that form a server consortium. Upon joining the server consortium, each of domain servers 202 and 209 may receive a digital certificate, $C_{server}$. Domain servers 202 and 209 may use their respective digital certificates to sign messages that, in some cases, may only be decrypted using the published security key (e.g., a public encryption key) of the server consortium. The server consortium may be associated with and publish a security key that various client devices can use to verify group signatures performed by servers that are associated with the server consortium. The server consortium may include a group manager server. The group manager server may publish the security key so other devices may retrieve it to decrypt and verify messages signed by servers of the server consortium. Advantageously, by using a group signature of the server consortium, devices that verify the group signature may not be able to individually identify the server of the server consortium that signed a message with the group signature.

For example, domain server 202 is shown to include a processor 204 and memory 206, in some implementations. In brief overview, through processor 204, domain server 202 can be configured to identify a client device (e.g., client device 218), calculate a confidence score indicating that the client device is not associated with a malicious entity, compare the confidence score to a threshold, and provide a security token to the client device responsive to the confidence score exceeding the threshold. One or more components within domain server 202 can facilitate communication between each component within domain server 202 and external components such as client device 218 and content server 232. Domain server 202 can include multiple connected devices (e.g., as a server bank, a group of blade servers, or a multi-processor system), each device can provide portions of the necessary operations. Domain server 209, processor 210, memory 212, and application 214 may be similar and perform similar operations to the respective components 204, 206, and 208 of domain server 202.

Processor 204 may comprise one or more processors configured to perform instructions on modules or components in memory 206 within domain server 202, in some implementations. In some implementations, processor 204 may execute modules within memory 206. Memory 206 is shown to include application 208, in some implementations. Application 208 may comprise an application, server, service, daemon, routine, or other executable logic to identify client devices that visit a website that is associated with domain server 202 (e.g., a website with a domain associated with domain server 202). Application 208 may identify the client devices based on the browsing activity of the client device on the web site. For example, a client device may create a user account on a website. Application 208 may identify the client device from the account information of the user account. Application 208 may identify each instance that the client device logs into the user account. In some implementations, application 208 may identify client devices at each instance that each client device visit the website. Application 208 may increment and maintain counters each time a client device logs into the user account and/or the client device visits the website.

Application 208 may determine a confidence score indicating a likelihood that the client device is not associated with a malicious entity. Application 208 may determine the confidence score based on the browsing activity of the client device and various rules that are associated with the server consortium of domain server 202. Each server in the server consortium may implement the same rules to determine confidence scores for the various client devices. For example, a rule of the server consortium may indicate that if a client device creates a user account on a web site, the server associated with the web site may assign a confidence score of 40% to the client device. Another rule may indicate that each time the client device logs into the user account, the confidence score will increase by 5%. Consequently, if a client device creates an account on a website and logs in to the account of the website five times, the server associated with the website may assign a confidence score of 65% to the client device.

In another example, user accounts may be associated with values. A server consortium may have rules indicating that higher values are associated with higher confidence scores (e.g., a value of 100,000 may be associated with a confidence score of 70% while a value of 10 may be associated with a confidence score of 5%). A server of the server consortium may identify a value associated with a user account from the account information of the user account and determine a confidence score for a client device associated with the user account using the rules. In some cases, the server may use rules to evaluate various combinations of account information (e.g., the value and the account creation; account creation and number of logins; the value, account creation, a number of logins, previous instances of authenticated communication, interaction history, etc.) to determine the confidence score for the client device. Different server consortiums may have different rules and determine confidence scores for client devices based on different account information or data. The server consortiums can implement any number of rules to determine confidence scores for client devices.

Servers of server consortiums may use any type of method to determine the confidence scores for the client devices. For example, the servers may implement machine learning models (e.g., a neural network, Random Forest, a support vector machine, etc.) using user account information and other information (e.g., value, time of creation, type of website, number of logins, number of site visits, etc.) as signals to determine a confidence score indicating a likelihood that a client device is not associated with a malicious entity. The machine learning models that are used to determine the confidence scores may be trained using supervised, unsupervised, or semi-supervised methods and use live data to continue training as the models continue to determine probabilities for client devices as they visit and perform various interactions on websites associated with various servers. In another example, the servers may implement a look-up table in a database and compare account information to the look-up table. The look-up table may be in a cloud database that each server of the server consortium may access. If a user account is associated with specific user account information (e.g., a value exceeding a threshold, a number of logins, etc.), a server may determine a confidence score associated with the user account information from the look-up table.

Once application 208 determines a confidence score for client device 218, application 208 may compare the confidence score to a threshold. The threshold may be a predetermined threshold set by an administrator indicating that application 208 has collected enough data and has enough confidence that client device 218 is not associated with a malicious entity. The predetermined threshold may be associated with the server consortium of domain server 202 (e.g., each server of the server consortium may implement the same threshold). In some implementations, the predetermined threshold may be specific to the server of the of the server consortium. If application 208 determines that the confidence score exceeds the predetermined threshold, application 208 may store a security token in a browser (described in greater detail below) of client device 218. If application 208 determines the confidence score does not exceed the predetermined threshold, application 208 may not store the security token in the browser. In some implementations, application 208 may store a security token in the browser of client device 218 without comparing the confidence score associated with client device 218 to the threshold.

When application 208 stores a security token in the browser of client device 218, application 208 may include a determined confidence score of client device 218 in the security token (e.g., as metadata of the security token, as an identification in a header of the security token, etc.). In some implementations, the server may also include an identification of the server consortium with which the server is associated in the security token (e.g., in a header of the security token). Application 208 may sign the security token using the certificate that domain server 202 received upon joining the server consortium. Advantageously, by using the certificate associated with the server consortium to sign the security token, a client device or a server (e.g., content server 232) that receives the security token can verify that a server associated with the server consortium provided the security token including the information determined by the server without being able to individually identify the server that provided the security token. Consequently, malicious parties (e.g., eavesdroppers) or other devices, such as content servers, may not be able to determine a relationship between the client device that received the security token and the server that provided it.

In some implementations, application 208 may randomly partition identifiers of various client devices that are associated with the web site of application 208 (e.g., have a user account with the website, have logged into the website, have visited the website, etc.) into groups (e.g., subgroups of the server consortium). To randomly partition the identifiers into groups, application 208 may hash the account identifiers (e.g., using SHA-2, SHA-256, MD5, etc.) so the client devices and the associated user accounts may remain anonymous and/or heterogeneous. Advantageously, by randomly partitioning the identifiers of the client devices, servers may partition the identifiers without using a common characteristic of the client devices. Consequently, content servers and malicious parties may not be able to identify or collect any private information about the client devices based on common characteristics of the groups of the identifiers.

In some implementations, application 208 may partition the identifiers based on identification data of each client device. For example, application 208 may partition the identifiers based on the location of the associated client devices when they created a user account, values associated with the user accounts when the client devices created their user account, previous websites that the client devices had visited when they created their user account, etc. Application 208 may use data associated with the user accounts that remains fixed when partitioning the identifiers into groups so the identifiers may remain in the same group.

Application 208 may partition the identifiers of the various client devices into groups so the number of client devices in each group exceeds a threshold. The threshold may be a predetermined threshold set by an administrator so the client devices may not be individually identified based on the group that they are in. For example, application 208 may partition each group so each group include a number of identifiers that exceeds $10^5$. The predetermined threshold may be associated with any number of identifiers.

For each group, domain server 202, via application 208, may operate as a group manager and distribute browser certificates to client devices associated with the group via the security tokens that application 208 stores in the browsers of the client devices. The client devices may use the browser certificates to sign messages sent by the browser with a group signature of the group that the browser is associated with. Application 208 may also distribute subgroup security keys to the client devices in the security tokens. The subgroup security keys may be security keys that another device may use to decrypt the group signatures made by the client devices. Application 208 may sign the security token by encrypting an authentication string (e.g., a hash of a string such as plaintext of a message or a subgroup security that application 208 sends with the security token) with the server consortium group signature using the $C_{server}$. Application 208 may also send a time until expiration (e.g., a time to live) for both the subgroup security key and the browser certificate in the security token. Consequently, in addition to the confidence score and an identification of the server consortium that domain server 202 is associated with, application 208 may include a browser certificate, $C_{browser}$, a subgroup security key, $K_{group}$, and a server consortium signature $$S(K_{group}, C_{server})$$

in the security token. S may be a signature function, $K_{group}$ may be a subgroup security key and the authentication string that is encrypted in the signature, and $C_{server}$ may be the certificate that the server uses to provide the group signature in security tokens that application 208 stores in client device browsers. Application 208 may also provide a time until expiration of both the security key and the browser certificate in the security tokens. In some implementations, application 208 may perform a hashing function on $K_{group}$ before encrypting it with $C_{server}$. Application 208 may encrypt any string in the signature (e.g., plaintext of the message accompanying the signature, a timestamp, a nonce, etc.).

Client device 218 may comprise any type and form of media device or computing device, including a desktop computer, laptop computer, portable computer, tablet computer, wearable computer, embedded computer, smart television, set top box, console, Internet of Things (IOT) device or smart appliance, or any other type and form of computing device. Client device(s) may be referred to variously as a client, device, client device, user device, computing device, anonymized computing device or any other such term. Client device(s) may receive data via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

Client device 218 may comprise one or more client devices configured to request and receive content from content server 232 without providing identifying information of client device 218 or of either of domain servers 202 and 209 to content server 232. Client device 218 is shown to include a processor 220 and memory 222, in some implementations. One or more components within client device 218 can facilitate communication between each component within client device 218 and external components such as content server 232, domain servers 202 and 209 and various other computing devices (not shown).

Processor 220 may comprise one or more processors configured to perform instructions on modules and/or components in memory 222 within client device 218, in some implementations. Memory 222 is shown to include a browser 223. Browser 223 may connect to the Internet via network 216 and visit websites requesting content from various content servers such as content server 232. Browser 223 is shown to include a token receiver 224, a token calculator 226, and a token generator 228, in some implementations. Memory 222 and browser 223 may include any number of components. By executing instructions on modules in memory 222 to perform the operations of each component 224, 226, and 228, processor 220 can prevent content server 232 (or any other content server) from individually identifying client device 218 or a domain server (e.g., domain server 202 or domain server 209) that provided a security token to client device 218 based on information in a request for content made by client device 218.

Browser 223 is shown to include token receiver 224. Token receiver 224 may comprise an application, server, service, daemon, routine, or other executable logic to receive security tokens from various servers (e.g., domain server 202 or 209). Token receiver 224 may receive security tokens from servers upon performing browsing activity on websites associated with the servers. In each security token, token receiver 224 may receive the security token and retrieve an identification of a server consortium of a server that provided the security token, a browser certificate, a subgroup security key, a server consortium group signature, and a time until expiration of the browser certificate and the subgroup key from the security token and store them in a database (not shown). Token receiver 224 may remove (e.g., discard) the browser certificate and the subgroup key from the database once the time until expiration has been met (e.g., the browser certificate and the subgroup key have expired).

Upon receiving the security token, token receiver 224 may identify the identification of the server consortium and retrieve a group security key of the server consortium. Token receiver 224 may retrieve the group security key from a database within memory 222 or from a published web site associated with a group manager server of the server consortium. Token receiver 224 may retrieve the group security key and verify the group signature $$S(K_{group}, C_{server})$$

with the group security key. Token receiver 224 may verify the group signature by decrypting the group signature with the group security key and comparing the subgroup security key with the decrypted signature. If token receiver 224 determines the subgroup security keys match, token receiver 224 may determine the group signature is authentic.

Upon visiting a website, browser 223 may request content from content server 232. To prove to content server 232 that client device 218 is not associated with a malicious entity, browser 223 may include a client security token in the request for content. Because browser 223 may receive multiple security tokens from various servers while browsing the Internet, browser 223 may need to calculate, via token calculator 226, which subset of security tokens to include in the request for content. Browser 223 may need to do so without providing security tokens that could enable content server 232 to individually identify client device 218 from an intersection of client devices that may be associated with the server consortiums that are associated with the security tokens. For example, there may be 10,000 client devices associated with a server consortium associated with shoes, 5,000 client devices associated with a server consortium associated with basketball 2,500 client devices associated with a server consortium associated with tennis, and 1,000 client devices associated with a server consortium associated with pianos. Only five client devices may have received security tokens from the server consortium associated with shoes and the server consortium associated with pianos while 2,000 client devices may have received security tokens from the server consortium associated with basketball and the server consortium associated with shoes. Content server 232 may be able to identify client device 218 based on the security tokens of the shoe and the piano consortiums while client device 218 may remain anonymous if browser 223 sends the security tokens of the shoe and the basketball consortiums to content server 232. As described below, token calculator 226 may determine which security tokens to send to content server 232 so client device 218 may remain anonymous in a request for content.

Token calculator 226 may comprise an application, server, service, daemon, routine, or other executable logic to calculate which security tokens to include in a request for content from content server 232. Token calculator 226 may identify the identifications of each server consortium that is associated with security tokens stored in browser 223. In some implementations, token calculator 226 may send the identifications to a central server (not shown) that can determine the number of client devices that is associated with each server consortium and, in some cases, the number of client devices that are associated with each intersection of the server consortiums. To determine the number of client devices that are associated with each server consortium or intersection of server consortiums, the central server may receive indications from client devices indicating that they are associated with a server consortium or group of server consortiums. The central server may increment and maintain a counter associated with each server consortium and/or intersection of server consortiums for each client device that sends the central server an indication that the client device is associated with the server consortium or group of server consortiums. Based on the count of the counter, the central server can determine numbers of client devices that are associated with intersections between any number of server consortiums and/or the number of client devices that are associated with each server consortium. The central server may determine and transmit the number of client devices of each server consortium and intersection of server consortiums for which token calculator 226 sends identifications.

In some implementations, instead of transmitting a number of client devices that are associated with each server consortium to token calculator 226, the central server may transmit a value of a Boolean variable (e.g., a variable with possible values of yes and no or 1 and 0) indicating whether the number of client devices associated with each server consortium or subset of server consortiums exceeds a threshold. The threshold may be set by an administrator. Token calculator 226 may receive the value of the Boolean variable and determine if there are enough client devices associated with the server consortium or subset of server consortiums to remain sufficiently unidentifiable based on the value of the Boolean variable. Advantageously, if the central server only sends a Boolean variable to token calculator 226, client device 218 may not be able to determine a number of devices that are associated with the server consortium or subset of server consortiums.

Once token calculator 226 receives the number of client devices that are associated with each server consortium and intersection of server consortiums, token calculator 226 may identify a subset of security tokens that are associated with an intersection of server consortiums that is associated with a number of client devices that exceeds a threshold. The threshold may be a predetermined threshold set by an administrator so client device 218 may remain anonymous in a request for content. Token calculator 226 may compare counts of each subset of security tokens to the threshold to determine which subset of security tokens is associated with enough client devices to exceed the threshold. Token calculator 226 may select a subset of security tokens to send to content server 232 with a request for content that is associated with enough client devices to exceed the threshold. In some implementations, token calculator 226 may select the subset of security tokens that is associated with the highest number of client devices.

Once token calculator 226 selects a security token or a subset of security tokens to send to content server 232, token generator 228 may generate a client security token and transmit the client security token to content server 232. Token generator 228 may comprise an application, server, service, daemon, routine, or other executable logic to generate a client security token and transmit the client security token to content server 232 with a request for content. Token generator 228 may identify the security tokens that token calculator 226 selected to send to content server 232 and generate client security tokens for each of the selected security tokens or a client security token that comprises all or a portion of the data of the selected security tokens.

For each of the selected security tokens, token generator 228 may generate a client security token including a signature of the browser with the following equation $$S(nonce \| timestamp, C_{browser})$$

S may indicate a signature function. $\|$ depicts concatenating values of separate strings into one string, or method to compose a message that include multiple other messages. Token generator 228 may determine the nonce through the use of a counter that is constantly incrementing (e.g., incrementing corresponding to time, messages sent between client device 218 and content server 232, etc.). The nonce may be synchronized between client device 218 and content server 232 so content server 232 will know the nonce that token generator 228 used in the signature. In some implementations, client device 218 may send all or a portion of the nonce to content server 232 with the request for content so content server 232 can identify the nonce and decrypt the security token. The timestamp may be the time that token generator 228 transmits the client security token to content server 232. $C_{browser}$ may be the certificate associated with the subgroup with which client device 218 is associated and that browser 223 received when it received the respective security token from a server. Token generator 228 may sign the concatenated nonce and timestamp with $C_{browser}$. In some implementations, token generator 228 may perform a hashing function (e.g., SHA-256) on the concatenated nonce and timestamp before signing it with $C_{browser}$.

Further, token generator 228 may include the subgroup security key, $K_{group}$, and the signature $$S(K_{group}, C_{server})$$

that token receiver 224 received in the request for content. As described above, $K_{group}$ may be the security key that can decrypt and verify the signature $$S(nonce \| timestamp, C_{browser})$$

and $C_{server}$ may be the certificate that the server that stored the selected security token in browser 223 used to sign the selected security token with a group signature of a server consortium. Token generator 228 may also include an identification of the server consortium that is associated with the selected security token in the client security token (e.g., in a header of the client security token) and the confidence score that was included with the selected security token. Token generator 228 may generate the client security token and transmit the client security token to content server 232 with a request for content.

Content server 232 may comprise one or more servers or processors configured to receive a request for content; determine whether the request for content was transmitted by a client device that is not associated with a malicious entity to a degree of certainty; and, if content server 232 determines that client device 218 is likely not associated with a malicious entity, transmit content to client device 218. For example, content server 232 is shown to include a processor 234 and memory 236, in some implementations. In brief overview, through processor 234, content server 232 can be configured to receive a client security token or a subset of client security tokens from client device 218, identify an identification of the server consortium associated with each client security token, retrieve a security key associated with the server consortium, decrypt the client security token with the security key, verify that the client security token is associated with the server consortium, determine if a confidence score of the client security token exceeds a threshold, and, if the content server 232 determines that the client security token is associated with the server consortium and the confidence score exceeds the threshold, transmit content to client device 218.

One or more components within content server 232 can facilitate communication between each component within content server 232 and external components such as client device 218 and content server 232. Content server 232 can include multiple connected devices (e.g., as a server bank, a group of blade servers, or a multi-processor system), each device can provide portions of the necessary operations.

Processor 234 may comprise one or more processors configured to perform instructions on modules or components in memory 236 within content server 232, in some implementations. In some implementations, processor 234 may execute modules within memory 236. Memory 236 is shown to include token receiver 238, verifier 240, application 242, transmitter 244, and characteristic database 246, in some implementations. Each of components 238-246 may cooperate to determine that a client device that transmitted a request for content is likely not associated with a malicious party and transmit content to the client device. Components 238-246 may make the determination based on the contents of the client security token that client device 218 included in its request for content.

Token receiver 238 may comprise an application, server, service, daemon, routine, or other executable logic that can receive the request for content from client device 218 including the client security token or subset of client security tokens that client device 218 calculated. The request may also include an identification of the server consortium or a group of identifications of the server consortiums that provided the security token or subset of security tokens. Token receiver 238 may receive the request and identify the client security tokens and the identifications of the server consortiums associated with the client security tokens. As described above, the client security tokens may each comprise a group signature associated with a server consortium of a server that signed a security token, a signature associated with a subgroup of the server consortium, and a security key to decrypt the signature of the subgroup of the server consortium (in some cases the security key for the subgroup may be publicly available on a website associated with the server that signed the security token). In some implementations, the client security token may include an identification of the server consortium with which the client security token is associated.

Verifier 240 may comprise an application, server, service, daemon, routine, or other executable logic that can verify the signatures of the request for content from client device 218. Verifier 240 may identify the identification of the server consortium from the request (e.g., from a header of the request or from the client security token) and retrieve a security key (e.g., a public encryption key) associated with the server consortium. Verifier 240 may retrieve the security key from characteristic database 246 if it is stored in characteristic database 246 or from a website of a server of the server consortium (e.g., the website of the group manager server of the server consortium). Verifier 240 may decrypt the client security token (e.g., a signature of the client security token) using the retrieved security key.

To validate the digital signature, verifier 240 may decrypt the signature associated with the server consortium and identify a string of the decrypted signature as an authentication string. The authentication string may be a hashed value of the plaintext of the request, a hashed value of a nonce and/or a timestamp, etc. The authentication string may also be a hashed value of a subgroup security key. If the authentication string is a hashed value of a subgroup security key, verifier 240 may identify the subgroup security key that was sent with the request for content and perform a hashing function on the subgroup security key to obtain an expected authentication string. Content server 232 and client device 218 may be synchronized so they both perform the same hashing functions on the same data to obtain matching authentication strings. In some implementations, verifier 240 may concatenate the nonce and/or the timestamp to the contents of the request to obtain a concatenated string and hash the concatenated string to obtain the expected authentication string. Verifier 240 may compare the expected authentication string with the authentication string that verifier 240 decrypted to determine if they match. If the authentication strings match, verifier 240 may determine that a server associated with the server consortium associated with the identification provided the signature and transmitter 244 may transmit content to client device 218. Because the signature of the server consortium may be a group signature, verifier 240 may not be able to identify which server of the server consortium provided the signature of the client security token. If the authentication strings do not match, verifier 290 may determine that the signature was not provided by a server associated with the server consortium of the identification. Consequently, transmitter 244 may transmit a signal to client device 218 indicating no match was found and prevent transmission of content to client device 218.

In some implementations, once verifier 240 authenticates the signature of the server consortium, verifier 240 may verify a second signature of the client security token by decrypting the second signature using the subgroup security key that client device 218 provided in the request for content. Verifier 240 may decrypt the second signature to obtain a second authentication string. The second authentication string may be a hashed value of a nonce concatenated with a timestamp and/or a nonce, timestamp, and plaintext of the request concatenated together. Content server 232 may be synchronized with client device 218 so content server 232 may use the same timestamp and nonce value to obtain an expected authentication string. The timestamp may be associated with the time that client device 218 sent the request or the time that content server 232 received the request. Content server 232 (e.g., via verifier 240) may also know to perform the same hashing function on a concatenation of the timestamp and the nonce value as client device 218 to obtain the expected authentication string. Verifier 240 may compare the expected authentication string including the hashed timestamp and the nonce to the decrypted authentication string of the signature associated with the subgroup of the server consortium. If verifier 240 determines that there is a match, verifier 240 may determine that the signature was signed by a member of the subgroup of the server consortiums without being able to identify which member provided the signature. If verifier 240 determines that there is not a match, however, verifier 240 may determine that the request is not authentic and transmitter 244 may transmit a message to client device 218 to indicate that there was not a match, preventing any transmission of content to client device 218.

In some implementations, client device 218 may pass the timestamp to content server 232 with the request for content. Consequently, client device 218 and content server 232 may not need to synchronize their internal clocks. Further, client device 218 may randomly generate the nonce. In such instances, client device 218 may transmit the nonce to content server 232 with the request for content so content server 232 may know the nonce value to use to verify the second group signature.

In some implementations, to stop cyberattacks such as replay attacks, verifier 240 may identify a time of the time stamp of the authentication string and compare it to the current time (e.g., the time that content server 232 received the request for content). Verifier 240 may subtract the time of the time stamp from the current time to calculate a length of time. Verifier 240 may compare the length of time to a predetermined threshold, as set by an administrator, to determine if the length of time exceeds the threshold. If the length of time exceeds the threshold, verifier 240 may determine that the request for content is stale and prevent transmission of content. However, if the length of time does not exceed the threshold and the signature is otherwise valid (e.g., the authentication strings match), verifier 240 may determine that the signature is valid.

In some implementations, client device 218 may provide a signature with the client security token using a private encryption key of client device 218 instead of or in addition to the signature that client device 218 provided using the group signature of the subgroup of the server consortium. In such implementations, content server 232 may decrypt the signature using a public encryption key of client device 218 and authenticate the decryption using similar authentication techniques to those described above (e.g., determine if an authentication string of the signature matches an expected authentication string).

In some implementations, once verifier 240 determines that the signatures associated with the server consortium, the subgroup of the server consortium, and/or the client device are authentic (e.g., have been validated against an expected authentication string), application 242 may determine if there is enough information in the request for content including the client security token to determine that client device 218 is not associated with a malicious entity to a high enough likelihood to exceed a threshold. To do so, application 242 may identify and analyze characteristics of the client security token. The characteristics may be identifications and/or metadata associated with the client security token that provide information about the type of data the domain server that provided a security token to client device 218 used to determine that client device 218 is likely not associated with a malicious entity. The characteristics of the client security token may include, but are not limited to, a confidence score indicating a likelihood that client device 218 is not associated with a malicious entity that the domain server determined, the data that the domain server used to determine the confidence score, rules that the domain server applied to the data to determine the confidence score, an identification of a server consortium that the domain server is associated with, etc.

Application 242 may identify the characteristics of the client security token and determine if there is enough information to authenticate the request and client device 218 for transmitter 244 to provide content. To determine if there is enough information, application 242 may compare a confidence score associated with the client security token to a predetermined threshold that was set by an administrator. If the confidence score exceeds or satisfies the predetermined threshold, application 242 may determine that there is a high enough likelihood to determine that client device 218 is not associated with a malicious entity and transmitter 244 may transmit content to client device 218. However, if the confidence score does not exceed the predetermined threshold, application 242 may determine that there is not a high enough likelihood (or enough information) to determine that client device is not associated with a malicious entity and application 242 or transmitter 244 may prevent transmission of content to client device 218. Advantageously, by implementing a threshold that is set by an administrator of content server 232, content server 232 can further filter out requests from malicious parties if domain servers provide security tokens to client devices without enough confidence to satisfy content server 232. Content server 232 may not need to solely rely on domain servers to determine if client devices are associated with malicious entities and can instead perform their filtering to protect themselves from cyberattacks.

In some implementations, instead of applying the same predetermined threshold to confidence scores of each client security token, application 242 may apply the confidence scores of client security tokens to thresholds that are individually associated with the server consortium that the client security tokens are associated with. The thresholds associated with each client security token may be associated with a level of trust that content server 232 has with the server consortiums associated with the client security tokens. For example, content server 232 may have a high level of trust for a server consortium associated with shoes. Consequently, the server consortium may be associated with a low confidence score threshold (e.g., 60° 0). In another example, content server 232 may have a low level of trust for a server consortium associated with instruments. Consequently, the server consortium associated with instruments may be associated with a high confidence score threshold (e.g., 90° 0). The levels of trust may correspond to the criteria that the server consortiums use to determine confidence scores for various client devices. The trust, criteria, and thresholds for various server consortiums may be stored in characteristic database 246 of content server 232 as described below.

Application 242 may compare the confidence scores of the client security tokens to the thresholds associated with the server consortiums of the servers that determined the confidence scores to determine whether to provide content to client device 218 when client device 218 requests content.

In some implementations, application 242 may identify a confidence score of a client security token by determining its own confidence score indicating a likelihood that client device 218 is not associated with a malicious entity based on the characteristics of the client security token that content server 232 receives in a request for content. Application 242 may determine the confidence score using any method. For example, application 242 may implement a machine learning model (e.g., a neural network, Random Forest, a support vector machine, etc.) to determine a binary output indicating a likelihood that client device 218 is not associated with a malicious entity. Application 242 may provide signals to the machine learning model that application 242 received as characteristics of the client security token. Examples of signals include, but are not limited to, the confidence score of a client security token, a server consortium associated with a server that provided a security token, data that a server used to provide a security token, rules that the server applied to data to provide a security token, etc. The machine learning model may be trained using supervised, unsupervised, and/or semi-supervised methods and continue to be more accurate as it trains using live data. The machine learning model may provide a percentage indicating a likelihood that the client device 218 is not associated with a malicious entity. Application 242 may compare the percentage to a threshold. If the percentage exceeds the threshold, transmitter 244 may transmit content to client device 218. However, if the percentage does not exceed the threshold, transmitter 244 may prevent transmission of content to client device 218 or may provide content associated with a low value to client device 218.

In some implementations, application 242 may determine whether to provide content to client device 218 by implementing a series of rules on the characteristics of the client security token that content server 232 receives in a request for content from client device 218. For example, a rule may indicate that requests that include client security tokens that are associated with a specific server consortium may only include enough information for content server 232 to transmit content to client device 218 if the request includes enough client security tokens to exceed a threshold. Application 242 may increment and maintain a counter for each client security token that content server 232 receives with a request for content and transmit content to client device 218 if a count of the counter exceeds the threshold. If the count does not exceed the threshold, application 242 may prevent transmission of content to the client device 218 or transmitter 244 may transmit content associated with a low value. The rule may indicate that the client security tokens must be associated with different server consortiums, the same server consortium, or a combination of the same and different server consortiums for transmitter 244 to transmit content.

Characteristic database 246 may be a dynamic database including information about various server consortiums such as security keys (e.g., public encryption keys) associated with the server consortiums, criteria that needs to be met for content server 232 to determine client device 218 is not associated with a malicious party for various server consortiums, etc. Characteristic database 246 can be a graph database, MySQL, Oracle, Microsoft SQL, PostgreSql, DB2, document store, search engine, key-value store, etc. Characteristic database 246 can be configured to hold any amount of data and can be made up of any number of components. The security keys stored in characteristic database 246 may have been retrieved by token receiver 238 from a server associated with a website when token receiver 238 receives a client security token including an identification of a server consortium associated with the website. By storing the security keys for various server consortiums in characteristic database 246, content server 232 may verify signatures of the server consortiums more quickly because content server 232 may not need to retrieve the respective security keys from a server and/or web site of the server consortium. Instead, content server 232 can retrieve the security key from characteristic database 246.

As described above, the criteria that needs to be met for content server 232 to determine if client device 218 is likely not associated with a malicious party may include requirements that are specific to each server consortium. Content server 232 may have different levels of trust for each server consortium. Consequently, the requirements for criteria to be satisfied for each server consortium may differ based on the levels of trust. The requirements, levels of trust, and thresholds associated with each server consortium may each be stored in characteristic database 246. Advantageously, by storing and implementing different criteria to authenticate client device requests, content server 232 may avoid authenticating client device requests for content that include client security tokens associated with server consortiums without a strong system for determining which client devices are associated with malicious entities. Content server 232 may filter the client security tokens to only accept client security tokens associated with security consortiums that content server 232 trusts.

Transmitter 244 may comprise an application, server, service, daemon, routine, or other executable logic to transmit content to client devices (e.g., client device 218) in response to a request for content and a determination that there is a sufficient likelihood that the client device is not associated with a malicious party. If application 242 determines that there is not a sufficient likelihood that a requesting client device is not associated with a malicious entity (e.g., if a confidence score does not exceed a threshold), transmitter 244 may not transmit content to a requesting client device (e.g., transmitter 244 may prevent transmission of content to the client device). If application 242 determines that there is a sufficient likelihood that a requesting client device is not associated with a malicious entity, transmitter 244 may identify content and send the content to the requesting client device.

In some implementations, various content may be associated with different values. If application 242 determines a requesting client device is not associated with a malicious entity to a sufficient likelihood, transmitter 244 may transmit content that is associated with a high value. However, if application 242 determines that there is not a sufficient likelihood that a requesting client device is not associated with a malicious entity, transmitter 244 may select and transmit content associated with a low value to the requesting client device.

Figure 2B:
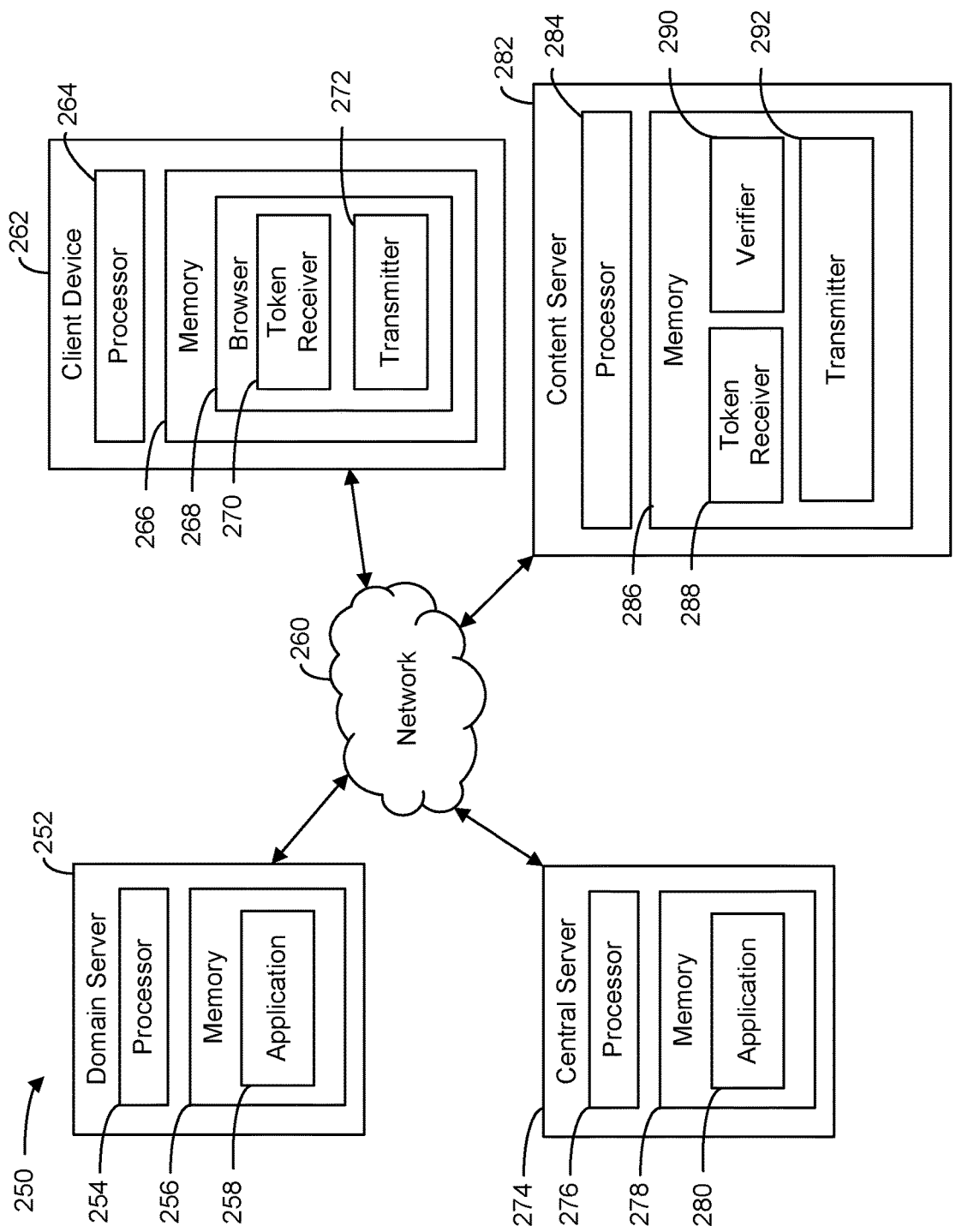
FIG. 2B is a block diagram of an implementation of a system for authenticated control of content delivery using a central server, according to some implementations.

FIG. 2B is a block diagram of an implementation of a system 250 for authenticated control of content delivery using a central server, according to some implementations. System 250 is shown to include a domain server 252, a network 260, a client device 262, a central server 274, and a content server 282, in some implementations. Domain server 252 is shown to include a processor 254, memory 256, and an application 258. Domain server 252 and its respective components may be similar to domain server 202, shown and described with reference to FIG. 2A. Network 260 may be similar to network 216. In system 250, client device 262 may receive a security token from domain server 252 which was calculated using similar methods to those described above. Client device 262 may send the security token to central server 274. As described below, central server 274 may verify that the security token is valid and send a central server security token to client device 262. Client device 262 may request content from content server 282 and include the central server security token in the request. Content server 282 may authenticate the central server security token and provide content to the requesting client device.

Client device 262 may be a client device similar to client device 218, shown and described with reference to FIG. 2A. Client device 262 is shown to include a processor 264 and memory 266. Memory 266 is shown to include a browser 268. Browser 268 may browse various webpages of the Internet and transmit requests for content to content servers (e.g., content server 282). Browser 268 is shown to include token receiver 270 and transmitter 272. Through token receiver 270 and transmitter 272, browser 268 may receive security tokens from domain server 252 once domain server 252 determines, to a confidence score threshold, that client device 262 is likely not associated with a malicious party. Domain server 252 may sign the security token with a private key of domain server 252 with the following signature:

$$S(\text{Domain of domain server} \| \text{nonce}, C_{server})$$

and send the security token to client device 262. In the signature, S may be a signature function, domain of domain server may be the domain name associated with domain server 252 or the server that otherwise provided the signature, the nonce may be a known value between client device 262 and domain server 252 as described above, and $C_{server}$ may be a certificate that domain server 252 used to provide the signature. In some implementations, the signature is a group signature of a server consortium as described above. Instead of transmitting the received security tokens to content server 282 with requests for content, transmitter 272 may transmit the security tokens, including, in some implementations, the domain name of domain server 252 and the nonce of the signature, to central server 274 to be authenticated before client device 262 requests content from content server 282.

Central server 274 may comprise one or more servers or processors configured to authenticate security tokens that client device 262 receives from domain server 252. Central server 274 is shown to include a processor 276 and memory 278. Memory is shown to include application 280. Through application 280, processor 276 may authenticate security tokens that client device 262 provides to central server 274, generate a central server security token, and transmit the central server security token to client device 262.

Application 280 may comprise an application, server, service, daemon, routine, or other executable logic to authenticate security tokens and provide central server security tokens to client device 262. Application 280 may receive a security token issued by domain server 252 from client device 262 and verify whether the security token was signed by domain server 252. Application 280 may retrieve the public key of domain server 252 (e.g., via a database (not shown) of central server 274 or from domain server 252) and use the public key to decrypt the signature of the security token to obtain a decrypted hash. Application 280 may compare the decrypted hash to an expected decrypted hash (e.g., the concatenated string of the domain associated with domain server 252 with a timestamp). If the hashes match, application 280 may determine that the security token is authentic and was signed by domain server 252. Consequently, application 280 may generate a central server security token using a private key of the central server including the following signature:

$$S(\text{central server domain}\|\text{timestamp}\|\text{nonce } K_{central\ server})$$

S may be a signature function, ∥ may be a concatenation between two strings function, central server domain may be a domain name associated with central server 274, the timestamp may be a timestamp as described above, the nonce may be a nonce as described above, and $K_{central\ server}$ may be a private key of central server 274 that central server 274 used to provide the signature. Application 280 may generate the central server security token and transmit the central server security token to client device 262.

In some implementations, the security token that client device 262 sends to central server 274 may also include an identification of a server consortium that domain server 252 is associated with and a confidence score that domain server 252 used to determine that client device 262 is likely not associated with a malicious entity. Application 280 may identify the server consortium and the confidence score and perform similar techniques to the techniques performed by content server 232, shown and described with reference to FIG. 2A, to determine whether to authenticate the security token and provide a central server security token. Advantageously, by using the central server 274 to authenticate the security token, domain servers, client devices, and content servers may each rely on a trusted server to authenticate the security token. Neither the domain servers nor the client devices may provide identifying information to content servers. Instead, the client devices may provide an authentication token to content server 282 from a trusted device (e.g., Central server 274 in FIG. 2B).

Via token receiver 270, client device 262 may receive the central server security token from central server 274 and use the central server security token in a request for content from content server 282. Transmitter 272 of client device 262 may associate (e.g., append) the central server security token to the request for content and send the request to content server 282.

Content server 282 may comprise one or more servers or processors configured to authenticate central server security tokens that client device 262 receives from central server 274. For example, content server 282 is shown to include a processor 284 and memory 286, in some implementations. Processor 284 may perform instructions in memory to receive the central server security token, authenticate the central server security token, and provide content to client device 262 based on the successful authentication. To perform these processes, memory 286 may comprise token receiver 288, verifier 290, and transmitter 292, in some implementations.

Token receiver 288 may comprise an application, server, service, daemon, routine, or other executable logic to receive the request for content including the central server security token from client device 262. Token receiver 288 may receive the request and identify the signature of central server 274 in the request for verifier 290 to determine whether there is a sufficient likelihood that client device 262 is not associated with a malicious entity.

Verifier 290 may comprise an application, server, service, daemon, routine, or other executable logic to authenticate the central server security token and verify that client device 262 is likely not associated with a malicious entity. Verifier 290 may identify the signature of central server 274 and retrieve a security key (e.g., a public encryption key) associated with central server 274 from a database of content server 282 or a website of central server 274. Verifier 290 may also identify the central server domain, a timestamp that corresponds to the time that central server 274 signed the central server token, and a nonce. Verifier 290 may create a hash of a concatenation of each of these values with a similar hashing technique to the hashing technique that central server 274 used when signing central server security token. Verifier 290 may decrypt the signature using the security key of central server 274 to obtain a hash and compare the hash to the hash that verifier 290 generated with the timestamp, the nonce, and the domain name of the central server. If verifier 290 determines there is a match, verifier 290 may determine that the signature is valid. Consequently, in implementations where central server 274 determines whether the information of the security is enough to show there is a high likelihood that client device 262 is not associated with a malicious party, transmitter 292 may transmit content to client device 262 in response to the request. Transmitter 292 may be similar to transmitter 244, shown and described with reference to FIG. 2A. If verifier 290 determines there is not a match, however, verifier 290 may determine that the signature is invalid and verifier 290 may prevent transmission of content to client device 262 for the request.

In some implementations, content server 282 may not trust central server 274 to authenticate the security tokens that client device 262 sends to central server 274 for authentication. In such implementations, content server 282 may receive information that the domain server (e.g., domain server 252) used to provide the security token to client device 262 and determine, through verifier 290, if the domain server is trustworthy and/or if there is enough information for content server 282 to authenticate client device 262 as having a high enough likelihood of not being associated with a malicious entity to exceed a threshold. Verifier 290 may perform similar processes to authenticate the request as application 242, shown and described with reference to FIG. 2A.

Figure 3:
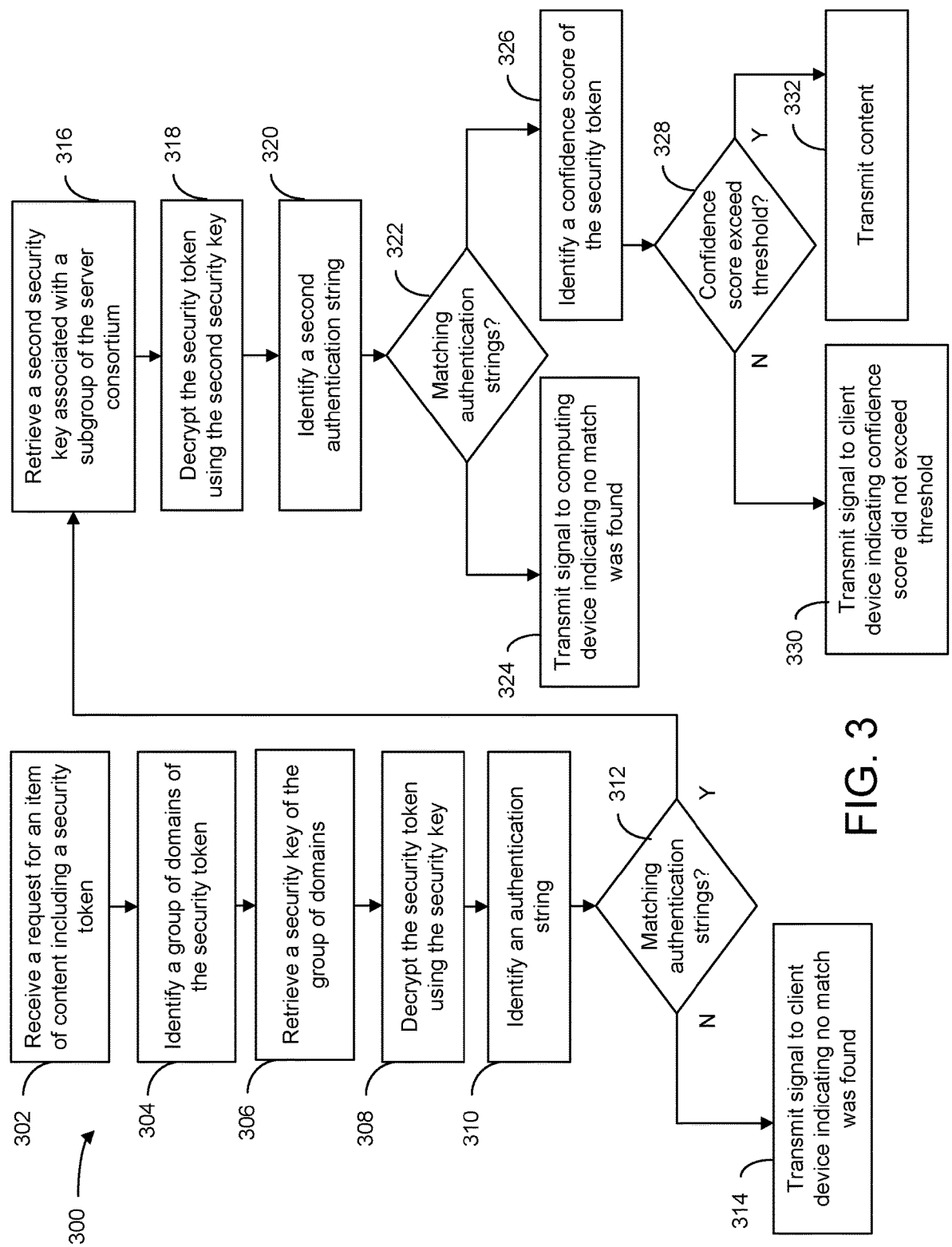
FIG. 3 is a flow chart illustrating a method for authenticated control of content delivery, according to some implementations.

Referring now to FIG. 3, a flow chart of a method 300 for authenticated control of content delivery is shown, according to some implementations. Method 300 can include any number of operations. The operations can be performed in any order. Method 300 can be performed by a server device (e.g., content server 232). At an operation 302, the server device can receive a request for an item of content including a security token. The server device can receive the request for an item of content from a client device when the client device accesses a web site. The request for an item of content may include a security token and an identification of a server consortium that is associated with the security token. The client device may have received the security token when a server of the server consortium determined, to a confidence score threshold, that the client device is not associated with a malicious entity. The request for an item of content may include multiple security tokens from servers associated with the same server consortium and/or servers associated with different server consortiums.

At an operation 304, the server device can identify a group of domains of the security token. The group of domains may include the domains that are associated with the servers of the server consortium. Each domain may be associated with a different server. The group of domains may be associated with a common characteristic or topic. For example, each domain may be associated with soccer. The server device may identify the group of domains from the identification included in the request for content.

At an operation 306, the server device can retrieve a security key of the group of domains. The group of domains may be associated with a group signature. Servers associated with the group of domains may sign messages (e.g., security tokens) with the group signature without another computing device being able to identify which server that is associated with the group of domains signed the message from the signature. To authenticate the group signature, the server device may retrieve the security key (e.g., the public encryption key) of the group of domains from a website associated with a group manager server associated with the group of domains.

At an operation 308, the server device may decrypt the security token using the retrieved security key. The server device may decrypt the security token by applying the retrieved security key to a signature that is associated with (e.g., appended to) the security token. At an operation 310, the server device may identify an authentication string. The authentication string may be a string of the decrypted signature that the server device can compare to a known value (e.g., an expected authentication string) to verify that the decryption was successful and consequently that a server associated with the server consortium associated with the identification signed the security token with the group signature. The server device may identify the authentication string from the signature that the server device decrypted using the security key of the server consortium. The authentication string may be or may include message plaintext of the security token, a second security key associated with a subgroup of the server consortium, a nonce, a time stamp, etc. In some implementations, the authentication string may be a hashed value of any of the examples above.

At an operation 312, the server device may determine whether the decrypted authentication string matches an expected authentication string. The server device may compare the decrypted authentication string to the expected authentication string. The expected authentication string may be provided in the security token that the server device receives in the request or be a string that the server device has determined and stored in a database of the server device. For example, the expected authentication string may be a second security key associated with a second signature associated with the security token. The request for content may include the second security key so the server device may compare the decrypted second security key with the second security key of the request. In some implementations, the second authentication string may be a hashed value of a string (e.g., a hashed value of the second security key). The server device may know the hashing function that was used to generate the hashed value of the string and perform a similar hashing function on the expected authentication string to verify that the hashed values match. If the hashed values of the second security keys do not match, at an operation 314, the server device may transmit a signal to the requesting client device indicating no match was found. In some implementations, the server device may stop method 300 upon determining that the authentication strings do not match.

If the server device determines that the hashed values of the second security keys match, however, at an operation 316, the server device may retrieve the second security key. The second security key may be associated with a subgroup of the server consortium. The subgroup of the server consortium may be a group that the server of the server consortium that provided the security token placed the requesting client device into based on characteristics of the client device (e.g., a value associated with an account of the client device, a physical location of the client device when the client device create the account, a time of day that the client device created the account, etc.). The server may operate as a group manager of the subgroup and provide the requesting client device with a certificate that the requesting client device can use to sign the security token of the request with a signature that may be decrypted using the second security key. The client device may include the second security key in the request for content. The server device may retrieve the second security key from the request for content, from a website associated with the server, or from a database of the server device.

At an operation 318, the server device may decrypt the security token using the retrieved second security key. The server device may decrypt the security token by applying the retrieved second security key to another signature that is associated with the security token. At an operation 320, the server device may identify a second authentication string. The server device may identify the second authentication string from the signature that was decrypted by the server device using the second security key. The second authentication string may be a string that is similar to the authentication string of operation 310 (e.g., may include message plaintext, another security key, a nonce value, a time stamp, etc.). The second authentication string may include any string. For example, the second authentication string may include a nonce value concatenated with a time stamp indicating the time that the client device sent the request for content.

At an operation 322, the server device may determine whether the decrypted second authentication string matches a second expected authentication string. The server device may compare the decrypted second authentication string to the second expected authentication string. The second expected authentication string may be provided in the security token that the server device receives in the request or be a string that the server device has stored in a database of the server device. For example, the second expected authentication string may include a nonce value concatenated with a timestamp. In some implementations, the second authentication string may be a hashed value of a string. The server device may know the hashing function that was used to generate the hashed value and perform a similar hashing function on a string comprising the same type of data to verify that the hashed values match. If the server device determines the second authentication strings do not match, at an operation 324 the server device may transmit a signal to the requesting client device indicating no match was found. In some implementations, the server device may stop method 300 upon determining that the second authentication strings do not match.

However, if the server device determines that the second authentication strings match, at an operation 326, the server device may identify a confidence score of the security token. The confidence score may indicate a likelihood, as determined by the server that provided the security token to the client device, that the client device is not associated with a malicious party. The server may determine the confidence score based on criteria and rules associated with the server consortium that the server is associated with (e.g., each server of the server consortium determines confidence scores for client devices using the same criteria and rules). Various server consortiums may determine the confidence scores based on different rules and criteria. The server device may identify the confidence score from the plaintext of the security token and/or the request for content.

At an operation 328, the server device may determine whether the confidence score exceeds a threshold. The threshold may be specific to the server consortium that the security token is associated with. Each server consortium may be associated with a different threshold based on the level of trust the server device has in the server consortium. For example, the server device may require confidence scores to be higher for security tokens that are associated with server consortiums that the server device has a low level of trust for and lower for security tokens that are associated with server consortiums that the server device has a high level of trust for. The server device may identify the threshold associated with the security token of the request and compare the confidence score of the security token to the threshold associated with the server consortium.

If the server device determines that the confidence score does not exceed the threshold, at an operation 330, the server device may transmit a signal to the client device indicating the confidence score does not exceed the threshold. In some implementations, the server device may instead transmit an item of content that is associated with a low value to the requesting client device. However, if the server device determines that the confidence score exceeds the threshold, at an operation 332, the server device may transmit content to the requesting client device.

Figure 4:
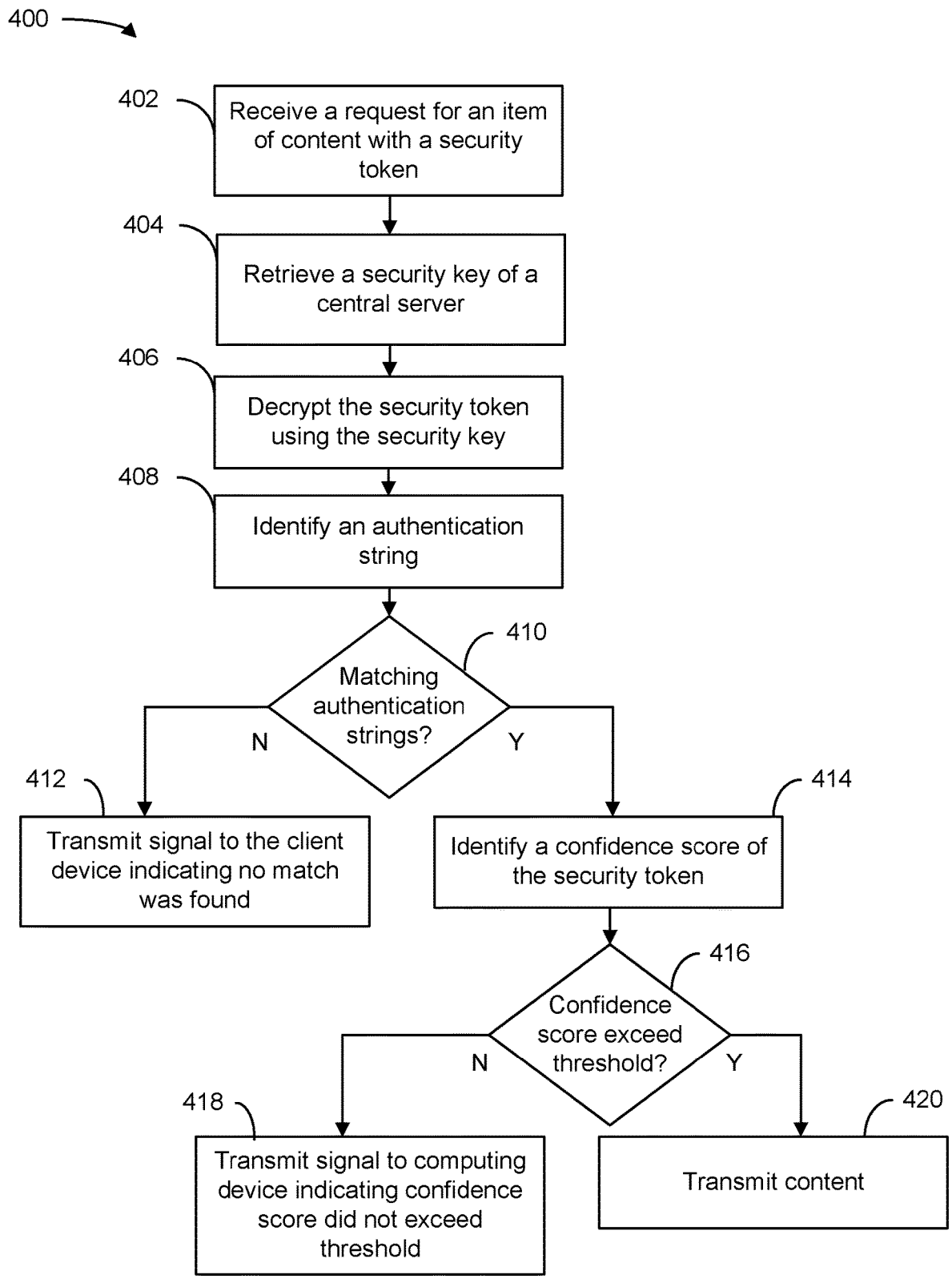
FIG. 4 is a flow chart illustrating a method for authenticated control of content delivery using a central server, according to some implementations.

Referring now to FIG. 4, a flow chart of a method 400 for authenticated control of content delivery using a central server for authentication is shown, according to some implementations. Method 400 can include any number of operations. The operations can be performed in any order. Method 400 can be performed by a server device (e.g., content server 232). At an operation 402, the server device can receive a request for an item of content including a security token. Operation 402 may be similar to operation 302, shown and described with reference to FIG. 3. The security token of operation 402, may, however, be associated with a signature associated with a central server instead of a server consortium. At an operation 404, the server device may retrieve a security key (e.g., a public encryption key) of the central server. The central server may be associated with a domain. The server device may retrieve the security key from the domain or otherwise from the central server. In some implementation, the server device may have the security key stored in a database of the server device. The server device may retrieve the security key from the database.

At an operation 406, the server device may decrypt the security token using the security key. The server device may decrypt the security token by identifying the signature of the security token and applying the security key to the signature. At an operation 408 the server device may identify an authentication string. The authentication string may be the string of the decrypted signature. The authentication string may be the plaintext of the message of the request; a concatenated value including the domain of the central server, a timestamp, and a nonce; or any other string. In some implementations, the authentication string may be a hashed value of these examples generated by a client device that sent the request for the item of content using a hashing function.

At an operation 410, the server device may compare the authentication string to an expected authentication string and determine if there is a match. The expected authentication string may be a corresponding authentication string that is stored in the server device. For example, the server device may be synchronized with the client device that sent a request for content so they both know the same nonce value and have a similar clock to determine a timestamp. Further, the server device may know which hashing function the client device used when providing the signature and that the client device hashed a string comprising the concatenation of the central server domain, the timestamp when the message was sent, and a nonce value. The server device may decrypt the signature using the security key of the central server and hash an expected authentication string comprising the same components with the same hashing function that the client device used. If the hashed values do not match, at an operation 412, the server device may transmit a signal to the client device indicating that no match was found or transmit low value content to the client device.

However, if the server device determines that the authentication strings match, at an operation 414, the server device may identify a confidence score of the security token. As described above, the confidence score may indicate a likelihood, determined by a server of a server consortium that provided another security token to the client device, that the client device is not associated with a malicious party. The request for content may include the confidence score that the server of the server consortium provided (e.g., in the plaintext of the request for content). The server device may identify the confidence score from the message.

In some implementations, instead of identifying a confidence score, the server device may provide the requesting client device with content based on the successful authentication of the signature of the central server. The central server may be a server that the server device trusts and that implements its own criteria to determine if a security token provided by a server of server consortium has provided enough information before storing a security token in the browser. Consequently, the server device may trust the central server and avoid extra processing in determining a likelihood that the requesting client device is associated with a malicious entity.

However, in other implementations, at an operation 416, the server device may determine whether the confidence score exceeds a threshold. The threshold may be specific to the server consortium that the security token is associated with. Operation 416 may be similar to operation 328, shown and described with reference to FIG. 3. If the server device determines that the confidence score does not exceed the threshold, at an operation 418, the server device may transmit a signal to the requesting client device indicating that the confidence score did not exceed the threshold or provide low value content to the requesting client device. If the server device determines that the confidence score exceeds the threshold, however, at operation 420, the client device may transmit content to the requesting client device.

Advantageously, by implementing a group signature hierarchy to authenticate requests for content, server devices may be able to filter out requests for content that originated at client devices of malicious entities. The group signature hierarchy may enable the client device to request content from content servers without providing enough information for the content servers to individually identify or fingerprint the client device or a server that provided a security token that the content server relies on to authenticate the request for content. The server that provides the security token to the client device may remain anonymous to the content server by providing a group signature associated with a server consortium that includes a large number of servers in the security token instead of a signature that is specific to the server. The client device may remain anonymous by providing a second group signature that is associated with a subgroup that the client device is a part of. The subgroup may be sufficiently large so the content server may not be able to identify the client device from the signature of the subgroup. Consequently, the content server that receives a request for content from a client device using the systems and methods described herein may be able to avoid providing content to malicious entities (e.g., entities using headless browsers to request content) while providing content to the client devices that are not associated with a malicious entity. While doing so, the content server may not be able to identify the client device that made the request or the server that provided the security token to the client device.

In situations in which the systems described herein collect personal information about users or applications installed on a user device, or make use of personal information, the users may be provided with an opportunity to control whether programs or features collect user information (e.g., information about a user's social network, social actions, or activities, profession, a user's preferences, or a user's current location). In addition, certain data may be treated in one or more ways before it is stored or used, so that personal information is removed. For example, a user's identity may be treated so that no personally identifiable information can be determined for the user, or a user' s geographic location may be generalized where location information is obtained (such as to a city, ZIP code, or state level), so that a particular location of a user cannot be determined. Thus, the user may have control over how information is collected about the user and used by a content server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's computing device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for authenticated control of content delivery, comprising:
   receiving, by a server device and from a browser of a computing device, a request for an item of content, the request comprising a security token including a signature generated based on a certificate issued to the browser by a central server that differs from the server device;
   retrieving, by the server device, a security key of the central server;
   decrypting, by the server device, the signature of the security token using the security key;
   identifying, by the server device, a string of the decrypted signature of the security token as an authentication string of the security token;
   determining, by the server device, that the security token is authentic based on the authentication string matching an expected authentication string of the central server that is stored at the server device;
   in response to determining that the authentication string matches the expected authentication string, comparing a confidence score included in the security token to a threshold confidence score;
   determining, by the server device, that the confidence score does not exceed the threshold confidence score based on the comparing; and
   in response to determining that the confidence score does not exceed the threshold, preventing, by the server device, transmission of the item of content to the computing device.

2. The method of claim 1, wherein the central server is configured to maintain and update a counter of client devices that are associated with one or more domain servers, and determine numbers of client devices that are associated with one or more domain servers.

3. The method of claim 1, wherein the security token associated with the central server and a domain thereof is sent by the central server to the computing device in response to determining that a client security token sent by the computing device to the central server is valid.

4. The method of claim 1 further comprising:
   transmitting, by the server device, a signal to the computing device indicating that the confidence score does not exceed the threshold.

5. The method of claim 1 further comprises:
   determining, by the server device, that the confidence score exceeds the threshold; and
   in response to determining that the confidence score exceeds the threshold, transmitting, by the server device, the item of content to the computing device.

6. The method of claim 1, wherein the threshold is associated with an identification of a group of domains, the method further comprising:
   identifying, by the server device, the group of domains from the identifier based on the security token;
   responsive to identifying the group of domains from the identifier, identifying, by the server device, the threshold associated with the identification of the group of domains, and comparing the confidence score to the threshold.

7. A server device for authenticated control of content delivery, comprising:

a network interface in communication with a first computing device of a plurality of computing devices; and
computer hardware, configured to:
  receive, via the network interface and from a browser of the first computing device, a request for an item of content, the request comprising a security token including a signature generated based on a certificate issued to the browser by a central server that differs from the server device;
  retrieve a security key of the central server;
  decrypt the signature of the security token using the security key;
  identify a string of the decrypted signature of the security token as an authentication string of the security token;
  determine that the security token is authentic based on the authentication string matching an expected authentication string of the central server that is stored at the server device;
  responsive to determining that the authentication string matches the expected authentication string of the central server that is stored at the server device, compare a confidence score included in the security token to a threshold confidence score;
  determine that the confidence score does not exceed the threshold confidence score based on the comparing; and
  responsive to the determination that the confidence score does not exceed the threshold, prevent transmission of the item of content to the first computing device.

8. The server device of claim 7, wherein the central server is configured to maintain and update a counter of client devices that are associated with one or more domain servers, and determine numbers of client devices that are associated with one or more domain servers.

9. The server device of claim 7, wherein the security token associated with the central server and a domain thereof is sent by the central server to the first computing device in response to determining that a client security token sent by the first computing device to the central server is valid.

10. The server device of claim 7, wherein the computer hardware is further configured to:
  transmit signal to the first computing device indicating that the confidence score does not exceed the threshold.

11. The server device of claim 7, wherein the computer hardware is further configured to:
  determine that the confidence score exceeds a threshold; and
  in response to determining that the confidence score exceeds the threshold, transmit, the item of content to the first computing device.

12. The server device of claim 7, wherein the threshold is associated with an identification of a group of domains and wherein the computer hardware is configured to compare the confidence score of the security token to the threshold by:
  identifying the threshold associated with the identification of the group of domains; and comparing the confidence score to the threshold.

13. A non-transitory computer readable medium storing instructions that, upon execution, cause one or more processors of a server device to perform operations comprising:
  receiving a request for an item of content, the request comprising a security token including a signature generated based on a certificate issued to a browser of a computing device by a central server that differs from the server device;
  retrieving a security key of the central server;
  decrypting the signature of the security token using the security key;
  identifying a string of the decrypted signature of the security token as an authentication string of the security token;
  determining that the security token is authentic based on the authentication string matching an expected authentication string of the central server that is stored at the server device;
  in response to determining that the authentication string matches the expected authentication string, comparing a confidence score of the security token to a threshold confidence score;
  determining that the confidence score does not exceed the threshold confidence score based on the comparing; and
  in response to determining that the confidence score does not exceed the threshold, preventing transmission of the item of content to the computing device.

14. The non-transitory computer readable medium of claim 13, wherein the central server is configured to maintain and update a counter of client devices that are associated with one or more domain servers, and determine numbers of client devices that are associated with one or more domain servers.

15. The non-transitory computer readable medium of claim 13, wherein the security token associated with the central server and a domain thereof is sent by the central server to the computing device in response to determining that a client security token sent by the computing device to the central server is valid.

16. The non-transitory computer readable medium of claim 13, wherein the instructions cause the one or more processors to perform operations further comprising:
  transmitting a signal to the computing device indicating that the confidence score does not exceed the threshold.

17. The non-transitory computer readable medium of claim 13, wherein the instructions cause the one or more processors to perform operations:
  determining that the confidence score exceeds the threshold; and
in response to determining that the confidence score exceeds the threshold, transmitting the item of content to the computing device.

* * * * *